Sept. 30, 1952 C. HERZSTARK Re. 23,553

ZEROIZING MECHANISM

Original Filed June 20, 1949 3 Sheets-Sheet 1

Inventor
Curt Herzstark.
By Singer Elbert Stern & Carlberg
Attys.

ZEROIZING MECHANISM

Original Filed June 20, 1949 3 Sheets-Sheet 2

Inventor
Curt Herzstark
by
Singer, Ehlert, Stern & Carlberg
attys

ZEROIZING MECHANISM

Original Filed June 20, 1949 3 Sheets-Sheet 3

Inventor
Curt Herzstark
by Linger, Ehlert, Stern & Carlberg
attys

Reissued Sept. 30, 1952

Re. 23,553

UNITED STATES PATENT OFFICE 23,553

ZEROIZING MECHANISM

Curt Herzstark, Mauren, Liechtenstein, assignor to Contina Bureaux- und Rechenmaschinenfabrik A. G., Liechtenstein Original No. 2,533,372, dated December 12, 1950, Serial No. 100,126, June 20, 1949. Application for reissue December 8, 1951, Serial No. 260,752

6 Claims. (Cl. 235—144)

Matter enclosed in heavy brackets [ ] appears in the original patent but forms no part of this reissue specification; matter printed in italics indicates the additions made by reissue.

The invention relates to a pocket-size calculating machine with transmission and counter elements of the product register and the revolution register arranged in a circle around a driving element, and relates in particular to a zeroizer or re-setting device with which both the product register and the revolution register or either, may be cleared (zeroized).

A curved toothed rack of the zeroizer is capable of being moved into the range of zeroizing wheels provided with gaps by the omission of one or more teeth, which zeroizing wheels, together with the numeral wheels, are successively brought to the zero position during the rotation of the zeroizer.

This known principle of counter mechanism zeroizing is here applied to pocket-size calculating machines which are provided with two counter mechanism units, namely a product counter mechanism and a revolution counter mechanism, arranged in a circle round a common drive member and capable of being lifted out of tooth engagement by axial displacement and of being cleared (zeroized) either singly or jointly.

The invention consists in the fact that the teeth of the zeroizer on the one hand, when the zeroizer is in its normal position span, without engaging, the counter mechanism members arranged in the smallest circle structurally conceivable in order that during calculation said members may rotate unobstructedly, and on the other hand may be brought from the normal position into engagement with all the counter mechanism members, including those spanned without being engaged, so that all the counter mechanism members can be zeroized. The bridging over the counter mechanism members by the teeth of the zeroizer without mutual engagement may be achieved by the provision of curved toothed racks laterally offset in relation to each other and correspondingly offset gaps in some of the counter mechanism members.

In the further extension of the invention, for the purpose of simplifying manipulation and enhancing reliability in action the zeroizer is so designed that, at the beginning of its operation it automatically, by means of a control and locking device, lifts the counter mechanisms (product register and revolution register), which are capable of being lifted out of engagement with the setting mechanism, and retains them in the lifted position until zeroizing is completed.

In addition, in order to simplify the design of the zeroizer and effect a saving in space, the zeroizing wheels on the numeral wheel axles are, in accordance with the invention, where they are beyond the range of engagement of the teeth of the zeroizer, each provided with ten teeth and constitute with this part the transfer members from the setting mechanism to the counter mechanism. It should also be mentioned that the zeroizer may, in accordance with the invention, be provided with a pivoting handle no parts of which project beyond the periphery of the machine when the latter is being carried in the coat pocket.

The drawing illustrates a typical embodiment of the zeroizer, designed in accordance with the invention, of a pocket-size calculating machine in which drawing.

It is pointed out that only those parts of the pocket-size calculating machine necessary for an understanding of the invention are illustrated. For a more detailed description of the calculating machine attention is called to applicant's copending applications Serials Nos. 1,455 and 1,456, both filed January 9, 1948. Application Serial No. 1,456 is now Patent No. 2,525,352, dated October 10, 1950.

Figure 2:
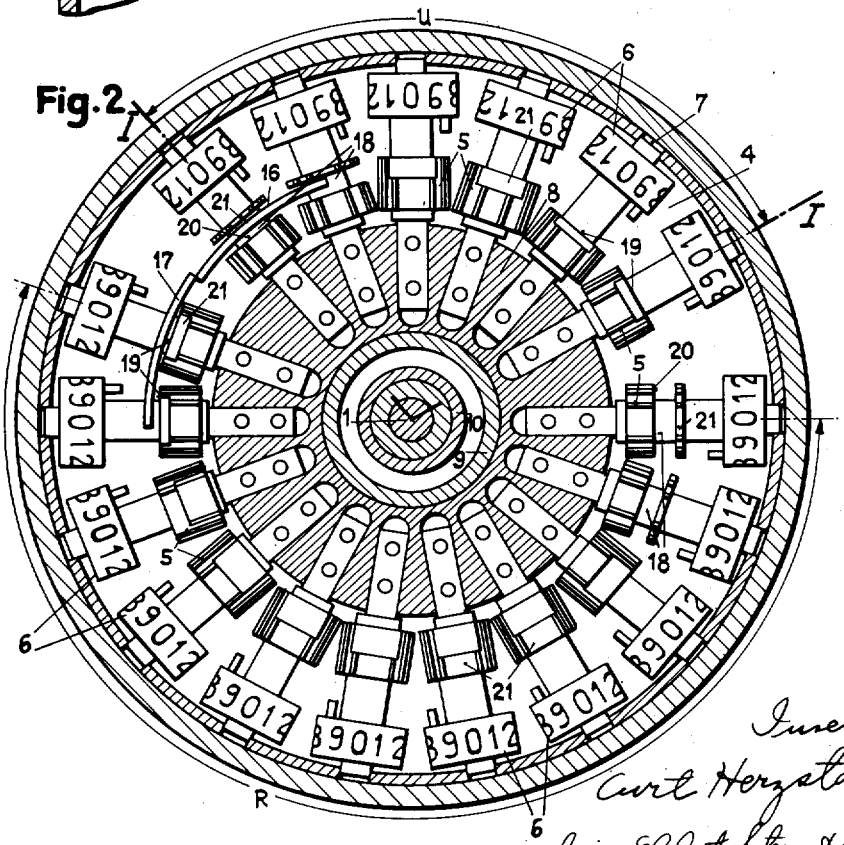
Fig. 2 shows a horizontal section along the line II—II in Fig. 1.
Figure 3:
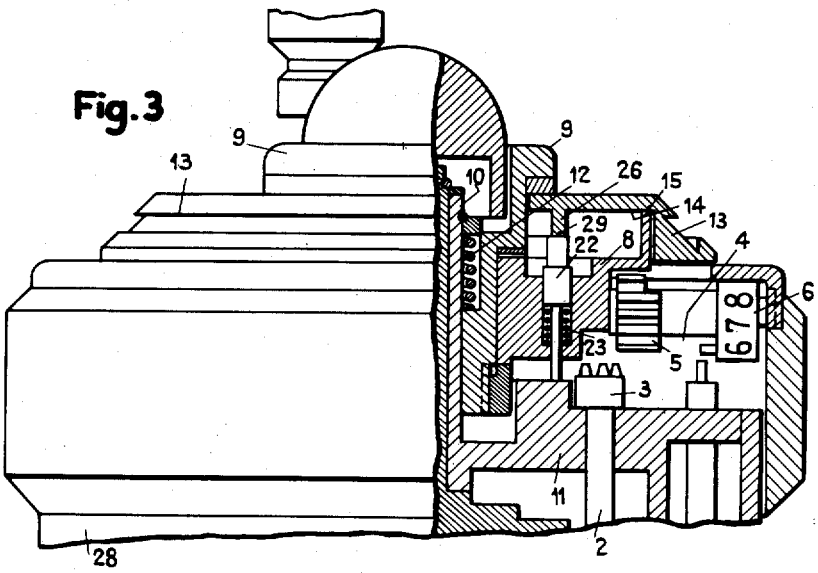
Fig. 3 shows the top of a calculating machine, with the counter mechanism lifted, in side elevation, partly cut away.

1 is the central mainshaft of the pocket-size calculating machine, on which mainshaft the driving unit, not shown in the drawing, is mounted. By said driving unit the transfer members (not shown) arranged in a circle are influenced, said members being arranged on the shafts 2 at the upper extremities of which the pinions 3 are mounted. When the counter mechanism 4 is in engagement, the pinions 3 engage the transfer wheels 5 which are rigidly connected with the numeral wheels 6 and are so mounted on the radially mounted axles 7 as to be freely rotatable on the latter. Said axles 7 are inserted in the counter mechanism body 8, which is mounted by means of a sleeve 9 so as to be freely rotatable about the central, hub-like extension 10 of the machine body 11 and can be axially displaced against the action of a compression spring 12 far enough for the transfer wheels 5 to be disengaged from the pinions 3 (Fig. 3). As can be seen from Fig. 2, the eleven-digit group of the numeral wheels 6 and transfer wheels 5 constitutes the product counter mechanism R and the six-digit group of the same members 5, 6, the revolution counter mechanism U.

The re-setting member 13 acts directly on the product counter mechanism R and on the revolution counter mechanism U. It forms a bowl-like body and is so secured on the sleeve 9 as to be freely rotatable thereon. By its inner end face 14 it bears against the upper edge 15 of the counter mechanism body 8 and carries two curved, toothed racks 16 and 17 laterally offset in relation to each other. In the two normal positions of the zeroizer 13, the curved toothed racks 16 and 17 occupy the free space between the counter mechanisms R and U. Owing to the fact that because of the smallness of the calculating machine this free space is closely restricted, said curved toothed racks 16 and 17 project within range of the toothed wheels of the penultimate or second digit of the product counter mechanism and of the second or penultimate digit of the revolution counter mechanism. To enable these toothed wheels to rotate unobstructedly when calculating operations are in progress, the toothed wheels 5 of the two first digits of both counter mechanisms are provided with reduced necks 18 and the toothed wheels 5 of the two last digits of both counter mechanisms are made narrower in width as indicated at 19, so that when the zeroizer is operated the teeth of the rack 17 do not mesh with these toothed wheels, as is clearly shown in Fig. 2. Upon rotation of the zeroizer the rack 17, however, engages the narrow gears 20 formed by the necks 18 on the toothed wheels 5 of the two first digits of both counter mechanisms. The rack 16 moves freely through the annular grooves or recesses formed by the necks 18 of the toothed wheels of both counter mechanisms and engages all the remaining toothed wheels 5 of both counter mechanisms. The result of the offsetting of the racks 16, 17 is that, when zeroizing is performed, the toothed wheels 5 provided with the neck 18 remain uninfluenced by the curved toothed rack 16, and are rotated by the curved toothed rack 17 to the zero position, whilst the curved toothed rack 16 acts on the narrowed toothed wheels.

Figure 10:
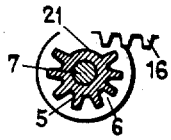
Fig. 10 illustrates in detail the cooperation of a rack on the re-setting member with the transfer wheel of the counter mechanism.

From the ten-tooth wheels 5 the teeth opposite the zero numeral on the numeral wheels 6 are, in the known manner, removed (Fig. 10), so that the curved, toothed racks 16 and 17 slide over these points, marked 21 in the drawing, without effect. By means of a partial rotation in opposite directions the product counter mechanism or the revolution counter mechanism, and by a complete rotation both counter mechanisms R and U successively, can be cleared with the zeroizer. For this reason there are two normal positions for the zeroizer. In one of said positions the curved racks 16, 17 are located as shown in Fig. 2, while in the second normal position they project into the recesses of the opposite toothed wheels 5, said recesses being provided by the necks 18 and the narrowing 19.

In order that when, on rotation of the zeroizer, one of the normal positions is reached, a noticeable resistance shall be felt in the hand, thus obviating inadvertent turning of the zeroizer beyond said normal position, a detent device is provided. In the present embodiment it comprises a stud or pin 22 movably mounted in the counter mechanism body 8 and parallel to the mainshaft 1, said stud or pin being, in the two normal positions of the zeroizer 13, forced by the pressure of a compression spring 23 into recesses 24 and 25 respectively. The two recesses 24 and 25 are provided in a downward annular projection 26 of the zeroizer 13 and are expediently furnished with oblique cam surfaces 27.

Figure 1:
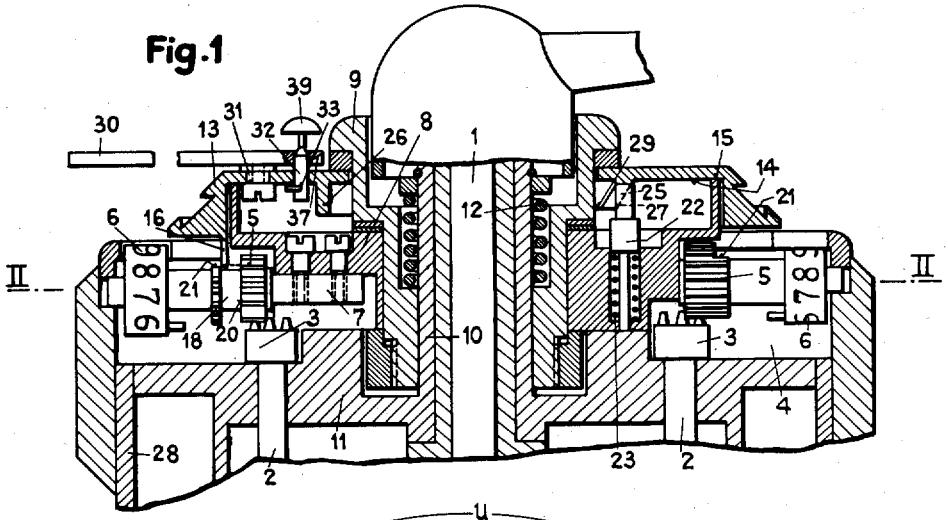
Fig. 1 shows the top of the pocket-size calculating machine, highly enlarged, in vertical section, along the line I—I of Fig. 2.

When zeroizing, the calculating machine is expediently held in one hand by the case 28 of the machine, the zeroizer 13 being operated with the other hand. The zeroizer with the counter mechanism 4 is then automatically lifted when the zeroizer 13, on its rotation, is lifted by one of the oblique cam surfaces 27 of the recess 25 bearing on the stud or pin 22 which in turn bears on the machine body 11 (see Figs. 1 and 3), the counter mechanism being lifted with it through the agency of the sleeve 9. As soon as the top end of the stud or pin engages the end face 29 of the annular projection 26, the toothed wheels 5 are lifted out of engagement with the pinions 3 (Fig. 3) and no return to the position of engagement is possible until the zeroizer 13 reaches the other normal position, because only then can the zeroizer, with the counter mechanism drop by the depth of the recess 24. To ensure that the zeroizing process shall not commence until the counter mechanism 4 has automatically been lifted out of engagement, a suitable clearance is provided, as shown in Fig. 2 between the curved racks 16 and 17 and the toothed wheels 5 first forced by said racks to rotate back to the zero position.

Clearing (zeroizing) can be effected by direct rotation of the bowl-shaped body of the zeroizer. Light pressure of the fingers is sufficient to effect this rotation, because not more than four figure-wheels at the same time are returned to zero, the resistances to be overcome being therefore very slight.

Figure 4:
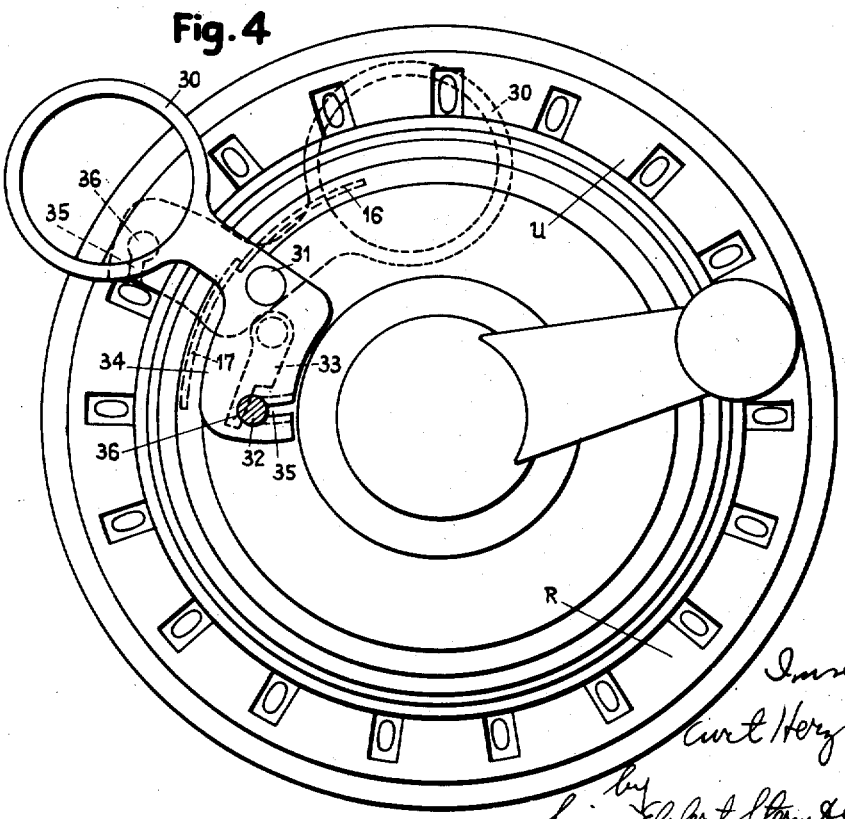
Fig. 4 shows the machine in plan.
Figure 5:
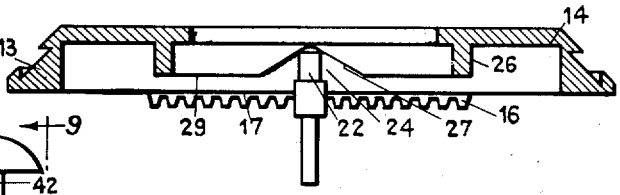
Fig. 5 shows the resetting member in vertical section.

It is also possible, however, to provide the zeroizer 13 with a handle 30 which, when not in use, can be pivoted into the position indicated in broken outline in Fig. 4. In this position the handle is included within the periphery of the counter mechanism housing and does not project from the calculating machine. This is of advantage from the point of view of convenience in storing the calculating machine, for instance in the coat pocket.

Figure 7:
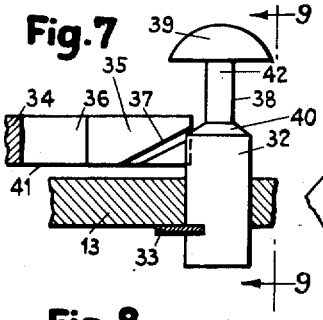
Fig. 7 illustrates an axially displaceable pin on the re-setting member for lockingly engaging a handle pivotally attached to said re-setting member.
Figure 6:
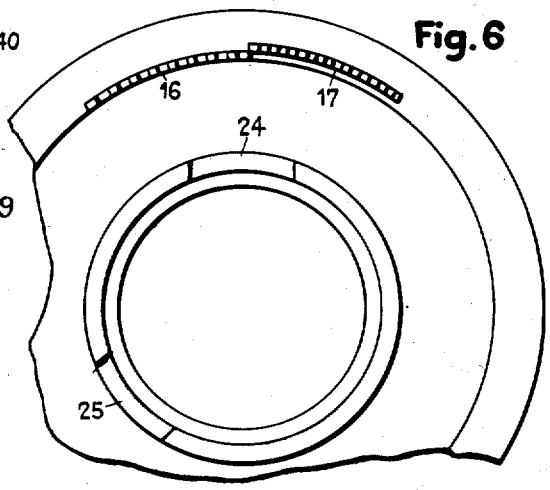
Fig. 6 shows the zeroizer as seen from below.
Figure 8:
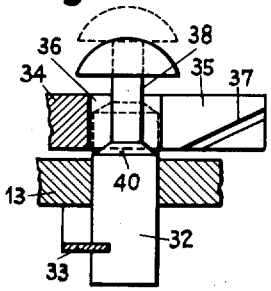
Fig. 8 illustrates the pin of Fig. 7 in a position in which the handle is locked in operative position to said re-setting member as shown in Fig. 4.

The handle 30 is pivotally secured to the zeroizer 13 by means of the pivot pin 31, and is automatically retained in the operating position when pivoted into that position. For this purpose a pin or stud 32 is so fitted into the zeroizer 13 as to be axially displaceable, a leaf-spring 33 forcing said pin or stud 32 outwards to the position shown in Fig. 7. The handle 30 is provided at the end with an extension 34 projecting from it at an angle with a rather narrow, curved slot 35 the curve of which represents an arc of a circle whose centre is the pivotal point 31 of the handle 30. Contiguous to the slot 35 is a round aperture 36 the diameter of which is adapted to receive the pin or stud 32 and which is wider than the slot 35. At the entrance to and on each side of the slot 35 an oblique surface is provided. The pin or stud 32 is further provided with a constriction or neck 38 limited at the top by a larger head 39 at the bottom by a taper shoulder 40. Fig. 7 shows the position occupied by the pin or stud 32 when the handle 30 is in the out-of-use position. If the handle 30 is pivoted to its position of readiness for use, it embraces by its oblique surfaces 37, shortly before reaching the ready-for-use position, the taper shoulder 40 and forces the pin or stud 32 downwards, against the action of the spring 33. As the handle 30 completes its movement the pin or stud 32 bears against the lower face 41 of said handle and finally enters the aperture 36 (Fig. 8), so that the handle is retained in the ready-for-use position. To pivot the handle back to its out-of-use position, the pin or stud is forced, by finger pressure on the head 39, out of the aperture 36 in a downward direction, the neck 38 being at the same time pressed into said aperture. The shank 42 of the stud 32, which shank determines the depth of the neck 38, is adapted to the slot 35, so that the handle 30 can be unobstructedly pivoted.

Figure 11:
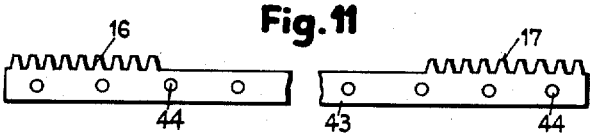
Fig. 11 illustrates a detail view of the racks attached to the circular re-setting member.
Figure 9:
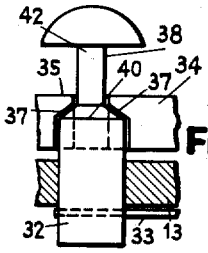
Fig. 9 shows a view of the pin and re-setting member along line 9—9 of Fig. 7.
Figure 12:
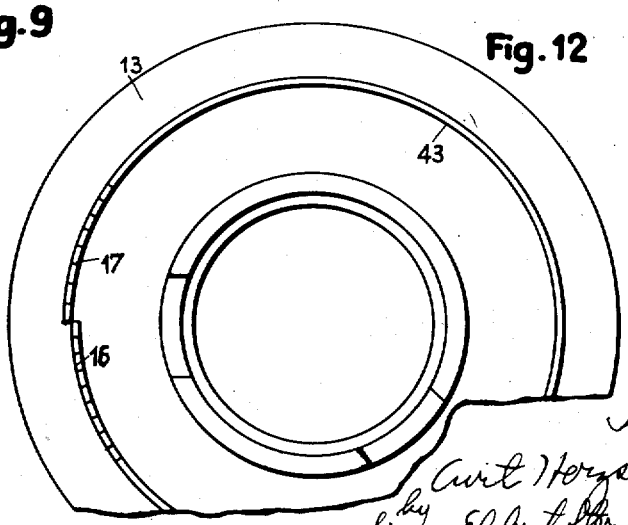
Fig. 12 is a bottom view of the circular re-setting member.

In the zeroizer with rigid curved racks it proves particularly advantageous to manufacture said racks, as shown in Fig. 11, as stampings in the form of a thin metal strip 43 both ends of which are provided with teeth. The length of the metal strip is such that when said strip is coiled into the shape of a coil of a flat spiral it possesses a radius corresponding to the required radius of the curved racks 16 and 17. The metal strip coiled into the form of a coil of a flat spiral is inserted in the mould at the time of die-casting the zeroizer case, and cast in (Fig. 12). To give enhanced rigidity to the coil, a row of holes 44 may be provided in the metal strip 43, into which holes the die-casting material flows.

When, with the present calculating machine, calculations simultaneously involving two or more factors are being made, said factors are set up in the counter in two or more columns, as the case may be, in such manner as to leave a number of digit spaces corresponding to the length of the curved rack clear between each two columns. This accomplishes complete separation of the part-calculations to permit clearing of a group of register wheels less than the whole.

I claim:

1. In a pocket-size calculating machine, a main shaft rotatably mounted in a casing, a plurality of shafts arranged spaced and parallel to said main shaft and along a circular line concentric with the axis of said main shaft, said shafts forming the driving members of a product counter mechanism and revolution counter mechanism respectively, a pinion at the end of each of said shafts and adapted to mesh with a transfer wheel, an axially movable body rotatably mounted about the axis of said main shaft and having fixedly mounted thereon a plurality of radially extending axles, one for each of said shafts, said transfer wheels being rotatably mounted on said radial axles and being each associated with a numeral wheel, a re-setting member rotatably mounted on said axially movable body and provided with two curved serially arranged re-setting racks adapted upon relative rotation with respect to said body to engage said transfer wheels, spring means for normally urging said body in an axial direction in which said transfer wheels engage the pinions on said shafts, and means operable upon initial rotation of said re-setting member for moving said body in the opposite direction in which said transfer wheels disengage said pinions, whereupon said re-setting racks upon continued rotation engage said transfer wheels and returns said numeral wheels to zero.

2. In a pocket-size calculating machine, a main shaft rotatably mounted in a casing, a plurality of shafts arranged spaced and parallel to said main shaft and along a circular line concentric with the axis of said main shaft, said shafts forming the driving members of a product counter mechanism and a revolution counter mechanism respectively, a pinion at the end of each of said shafts and adapted to mesh with a transfer wheel, an axially movable body rotatably mounted about the axis of said main shaft and having fixedly mounted thereon a plurality of radially extending axles, one for each of said shafts, said transfer, wheels being rotatably mounted on said radial axles and being each associated with a numeral wheel, a re-setting member rotatably mounted on said axially movable body and provided with two curved serially arranged re-setting racks adapted upon relative rotation with respect to said body to engage said transfer wheels, spring means for normally urging said body in an axial direction in which said transfer wheels engage the pinions on said shafts, and a pin mounted in said body and engaging selectively one of two recesses in said re-setting member to denote two end positions of the latter relative to the body and in which said re-setting racks are out of engagement with said transfer wheels, said recesses being provided with cam faces whereby upon initial rotation of said re-setting member the latter moves said body in the opposite direction in which said transfer wheels disengage said pinions, whereupon said re-setting racks upon continued rotation engage said transfer wheels and returns said numeral wheels to zero.

3. A pocket-size calculating machine according to claim 1, in which some of said transfer wheels, namely the ones which in the rest position of said resetting member are arranged directly below said resetting racks, are provided with recesses into which said resetting racks extend without operatively engaging said transfer wheels, said resetting racks being arranged laterally offset lengthwise of their curvature, so that upon operation of said resetting member each of said racks engages the recessed transfer wheels which in the rest position of the resetting member are not engaged by the other rack to return the same to zero.

4. A pocket-size calculating machine according to claim 1, in which the transfer wheels each have ten teeth and that one end portion of at least one tooth on said wheels opposite the zero numeral on the corresponding numeral wheels has been cut off, whereby said transfer wheels serve at the same time as resetting wheels.

5. *In a pocket-size calculating machine, a main shaft rotatably mounted in a casing, a plurality of shafts arranged spaced and parallel to said main shaft and along a circular line concentric with the axis of said main shaft, said shafts forming the driving members of a product counter*

*mechanism and a revolution counter mechanism respectively, a pinion at the end of each of said shafts and adapted to mesh with a transfer wheel, an axially movable body rotatably mounted about the axis of said main shaft and having fixedly mounted thereon a plurality of radially extending axles, one for each of said shafts, said transfer wheels being rotatably mounted on said radial axles and being each associated with a numeral wheel, a re-setting member rotatably mounted on said axially movable body and provided with two curved serially arranged re-setting racks adapted upon relative rotation with respect to said body to engage certain of said transfer wheels, the other transfer wheels, namely the ones which in the rest position of said re-setting member are arranged directly below said re-setting racks, being provided with recesses into which said re-setting racks extend without operatively engaging said transfer wheels, said re-setting racks being arranged laterally offset lengthwise of their curvature, so that upon operation of said re-setting member each of said racks engages the recessed transfer wheels which in the rest position of the re-setting member are not engaged by the other rack to return the same to zero.*

*6. In a pocket-size calculating machine, a main shaft rotatably mounted in a casing, a plurality of shafts arranged spaced and parallel to said main shaft and along a circular line concentric with the axis of said main shaft, said shafts forming the driving members of a product counter mechanism and a revolution counter mechanism respectively, a pinion at the end of each of said shafts and adapted to mesh with a transfer wheel, an axially movable body rotatably mounted about the axis of said main shaft and having fixedly mounted thereon a plurality of radially extending axles, one for each of said shafts, said transfer wheels being rotatably mounted on said radial axles and being each associated with a numeral wheel, a re-setting member rotatably mounted on said axially movable body and provided with two curved serially arranged re-setting racks adapted upon relative rotation with respect to said body to engage certain of said transfer wheels, the other transfer wheels, namely the ones which in the respect position of said re-setting member are arranged directly below said re-setting racks, being provided with recesses into which said re-setting racks extend without operatively engaging said transfer wheels, said re-setting racks being arranged laterally offset lengthwise of their curvature, so that upon operation of said re-setting member each of said racks engages the recessed transfer wheels which in the rest position of the re-setting member are not engaged by the other rack to return the same to zero, all of said transfer wheels each having ten teeth, and one end portion of at least one tooth on said wheels opposite the zero numeral on the corresponding numeral wheel having been cut off, whereby said transfer wheels serve at the same time as re-setting wheels.*

CURT HERZSTARK.

REFERENCES CITED

The following references are of record in the file of this patent or the original patent:

UNITED STATES PATENTS

| Number | Name | Date |
|---|---|---|
| 703,785 | Hamann | July 1, 1902 |
| 832,666 | Hamann | Oct. 9, 1906 |
| 2,294,083 | Friden | Aug. 25, 1942 |